(12) United States Patent
Wohlfarth

(10) Patent No.: US 8,678,401 B2
(45) Date of Patent: *Mar. 25, 2014

(54) LEVELING SHOCK ABSORBER AND STRUT ASSEMBLY

(71) Applicant: Klaus Wohlfarth, Fichtenberg (DE)

(72) Inventor: Klaus Wohlfarth, Fichtenberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/831,107

(22) Filed: Mar. 14, 2013

(65) Prior Publication Data

US 2013/0221627 A1    Aug. 29, 2013

Related U.S. Application Data

(63) Continuation of application No. 13/308,420, filed on Nov. 30, 2011, now Pat. No. 8,516,672, which is a continuation of application No. 12/258,929, filed on Oct. 27, 2008, now Pat. No. 8,070,171.

(60) Provisional application No. 61/001,153, filed on Oct. 30, 2007.

(51) Int. Cl.
*B60G 17/00* (2006.01)

(52) U.S. Cl.
USPC .................................... 280/6.157

(58) Field of Classification Search
USPC ............ 280/6.157, 6.159, 6.151, 6.15, 5.506, 280/5.507, 5.509; 267/221; 188/322.19, 188/321.11
See application file for complete search history.

(56) References Cited

U.S. PATENT DOCUMENTS

| 1,505,469 | A | 8/1924 | Keller |
| 3,586,306 | A | 6/1971 | Reece et al. |
| 3,881,441 | A | 5/1975 | Kader |
| 4,452,436 | A | 6/1984 | Gute |
| 4,458,605 | A | 7/1984 | Herring et al. |
| 4,505,457 | A | 3/1985 | Okada et al. |
| 4,531,618 | A | 7/1985 | Kobiske et al. |
| 4,531,759 | A | 7/1985 | Rezanka et al. |
| 4,615,512 | A | 10/1986 | Hoke |
| 5,044,614 | A | 9/1991 | Rau |
| 5,215,328 | A | 6/1993 | Bono et al. |
| 5,794,911 | A | 8/1998 | Hill |

(Continued)

FOREIGN PATENT DOCUMENTS

JP    2003214473 A    7/2003
KR    2010023347      3/2010

OTHER PUBLICATIONS

Quick Lift suspension technology ad (2006), 1 page, web site: http://www.gorancho.com/products/shocks/quicklift.php.

(Continued)

*Primary Examiner* — Faye M. Fleming
(74) *Attorney, Agent, or Firm* — Mark D. Miller; Marcus N. DiBuduo; William K. Nelson

(57) ABSTRACT

The present invention includes methods and apparatus for easily adjusting a shock and strut assembly to modify the ride height of a vehicle by providing one or more spacers to be placed between the lower spring seat mount and the spring seat plate that rests upon it in order to raise the ride height of a vehicle. Embodiments include a unique location for a lower spring seat mount. The position of the lower spring seat mount may be lowered to reduce the ride height of the vehicle, and one or more spacers may be inserted above the lower spring seat mount to raise the ride height of the vehicle.

25 Claims, 6 Drawing Sheets

(56) References Cited

U.S. PATENT DOCUMENTS

| | | |
|---|---|---|
| 5,961,106 A | 10/1999 | Shaffer |
| 6,076,841 A | 6/2000 | Satou et al. |
| 6,155,544 A | 12/2000 | Solomond et al. |
| 6,250,659 B1 | 6/2001 | Morris |
| 6,481,079 B1 | 11/2002 | Newhan |
| 6,538,237 B1 | 3/2003 | Yang et al. |
| 6,592,112 B2 | 7/2003 | Bishop et al. |
| 6,676,119 B2 | 1/2004 | Becker et al. |
| 6,827,184 B1 | 12/2004 | Lin |
| 6,902,045 B2 | 6/2005 | Olive et al. |
| 7,156,404 B2 | 1/2007 | Krieger |
| 7,237,780 B2 | 7/2007 | Ohki |
| 7,537,225 B2 | 5/2009 | Ryshavy et al. |
| 7,665,743 B2 | 2/2010 | Poncher et al. |
| 7,780,178 B2 | 8/2010 | Ryshavy et al. |
| 7,850,183 B1 | 12/2010 | Ryshavy et al. |
| 7,857,325 B2 | 12/2010 | Copsey et al. |
| 8,070,171 B2 | 12/2011 | Wohlfarth |
| 8,262,100 B2 | 9/2012 | Thomas |
| 2002/0038929 A1 | 4/2002 | Now |
| 2004/0232648 A1 | 11/2004 | Ohki |
| 2006/0001223 A1 | 1/2006 | Krieger |
| 2008/0191440 A1 | 8/2008 | Ryshavy et al. |
| 2008/0303235 A1 | 12/2008 | Poncher et al. |
| 2009/0200765 A1 | 8/2009 | Ryshavy et al. |
| 2010/0295259 A1 | 11/2010 | Ryshavy et al. |
| 2011/0221109 A1 | 9/2011 | Hinouchi |
| 2011/0318140 A1 | 12/2011 | Chang |
| 2012/0074660 A1 | 3/2012 | Thomas |

OTHER PUBLICATIONS

Photographs of OEM shock for Cam Am Spyder 3-wheeled motorcycle (2005), 3 pages.

Moon, Y., Shock Absorber for Automobile, English Abstract of Korean Patent Publication KR2010023347, Mar. 4, 2010, Derwent Information LTD.

Yamada, G., Suspension Device for Vehicle, English Abstract of Japanese Patent Publication JP2003214473, Jul. 30, 2003, European Patent Organization, http://www.epo.org/searching/free/espacenet.html.

Yamada, G., Suspension Device for Vehicle, Machine-generated English Translation of Japanese Patent Publication JP2003214473, Jul. 30, 2003, Japan Patent Office, http://www.jpo.go.jp/.

Office Action, Response and Notice of Allowance from U.S. Appl. No. 13/308,420.

LEVELING SHOCK ABSORBER AND STRUT ASSEMBLY

This is a continuation of U.S. Utility application Ser. No. 13/308,420 filed on Nov. 30, 2011, which is a continuation of U.S. Utility application Ser. No. 12/258,929 filed on Oct. 27, 2008 now U.S. Pat. No. 8,070,171, which claims the benefit of U.S. Provisional Application No. 61/001,153 filed on Oct. 30, 2007, all of which are incorporated herein in their entirety by this reference.

BACKGROUND OF THE INVENTION

1. Field of the Invention

The present invention relates to automotive suspension technology, and more specifically to shock absorber and strut assemblies and methods for using such assemblies in aftermarket modification.

2. Description of the Related Art

Shock absorbers have been used as a part of suspension systems for automobiles for many years as a means to lessen vibration of driving on rough road surfaces and to increase ride quality. Most strut assemblies commonly used on automotive vehicles include a shock absorber (dampener) with a coil spring. These strut assemblies are attached to the underside of a body of a vehicle and connect to the suspension. The upper mounting unit of such a strut assembly has a spring mounting unit and shock absorber shaft connection point which secures to the underside of the vehicle. The upper end of the spring sits in the upper mounting unit and extends downward surrounding the shock absorber. The spring mounts to a lower spring seat which is fixed to the exterior of the shock absorber. The shock absorber continues downward and connects to a steering knuckle or other component of the vehicle suspension. The combination of the spring and shock absorber lessens the vibration created while driving, and further plays a significant role in ride height. The coil springs are a given length when compressed with the load of the vehicle. The spring raises the riding height of the vehicle based on the location of the lower spring seat on the shock absorber. Depending on the vehicle, such a distance has been calculated, and the lower spring seat is fixedly attached to the shock absorber in a location to effectuate the desired lift in the vehicle.

Aftermarket modification of vehicles, specifically of suspension components, is a popular and ever-growing market. Markets have arisen for both the raising and lowering of vehicle ride height for both aesthetic purposes and for performance. Many cars and trucks are lowered and have modified suspension systems for improved handling in street applications; and many vehicles, including trucks, sport utility vehicles, and jeeps have raised ride heights and stronger suspension components for off-road applications. Many times the shocks and springs of such vehicles are replaced to change the handling characteristics of the vehicle. Softer or firmer coil springs may replace factory units in order to effectuate the ride preference of the driver. In addition, many different types of shock absorbers can be used offering the driver different options. When aftermarket components are used, they do not necessarily meet the dimensions of the factory units, and adjustment of the suspension may be necessary to obtain the desired ride height.

Aftermarket modifications, especially those which raise or lower the chassis of a vehicle, create unique problems not usually encountered with an unmodified vehicle. For instance, many modifications can be combined, thereby different dimensions and tolerances within the suspension system can be created which are not normally encountered. Further, some modifications may affect ride height by interchanging different components of the suspension of a vehicle. When this occurs, it may be desired to modify the ride height, but there is no simple method to effectuate such a solution. To compound the issue, labor on suspension systems can be difficult and time consuming. Accordingly, many consumers may be discouraged to modify the suspension of a vehicle due to the effort or the expense in labor costs to hire someone to install and properly configure an aftermarket suspension.

An example of a strut assembly that may be adjusted to change the vehicle ride height is disclosed in U.S. Pat. No. 6,902,045. However, the adjustment assembly disclosed involves the use of a ring gear that is adjusted by way of an outwardly protruding knob. Such a system includes inherent problems with regard to locking the ring gear in place, unintentional adjustment of the ring gear by accidental contact with the outwardly protruding knob, and further the difficulty to make exact adjustments in height. Additionally, wear on the ring gear may lead to failure thereby endangering the passengers of the vehicle.

Another strut assembly that allows for the adjustment in ride height is disclosed in U.S. Pat. No. 7,237,780. The device described in this patent uses a system involving two springs to adjust the ride height. This design includes a greater number of components thereby increasing costs and allowing for more potential points of failure.

It is therefore desirable to provide a shock absorber and strut system that is capable of being easily adjusted to raise or lower the ride height of the vehicle without the need to adjust or replace other components of the suspension.

SUMMARY OF THE INVENTION

The present invention includes methods and apparatus for easily adjusting shock and strut assemblies to modify the ride height of a vehicle. A typical factory shock and strut assembly includes a shock absorber (dampener) having a piston unit with a piston shaft extending from the top end of the shock absorber. A spring seat mounting unit is typically attached to the piston unit and a coil spring is typically secured between an upper spring seat and the spring seat mounting unit. The spring seat mounting unit typically has a spring seat mount extending radially outward from the shock absorber, to prevent downward movement of a lower spring seat plate. Methods and apparatus of the present invention provide for placing one or more spring seat spacers between the spring seat plate and the spring seat mount in order to raise or lower the ride height of a vehicle, thereby altering the ride height of the vehicle.

The present invention includes an aftermarket shock and strut assembly. Some of the components of these embodiments can be the unmodified original equipment in order to save cost, and prevent the duplication of parts. These embodiments include a shock absorber having a piston assembly with a piston shaft extending axially in one direction and an opening or other means for attachment connected to the other end of the piston assembly. In some embodiments, the shaft has a threaded end allowing for securing the shock absorber to the vehicle. The opening or other means for attachment at the other end of the shock absorber allows for securing the shock absorber to a steering knuckle, fork, or other component of the suspension of a vehicle. In some embodiments, the opening is a transversely oriented cylinder which accepts a bushing and bolt for connection to a suspension component.

In embodiments of the invention, a coil spring is secured around a shock absorber using an upper and a lower spring seat. The upper spring seat receives an upper end of the spring, and may be secured to the piston shaft extending upwardly from the shock and strut assembly. Alternatively, the spring seat may be attached to or incorporated into a portion of the vehicle to receive the upper end of the spring. When used, the upper spring seat can be created in many different configurations. In most embodiments, the upper spring seat is a plate with a relatively flat surface at least as large as the diameter of the coil spring designed to receive the upper end thereof. The upper spring seat can have lips, indentations, and/or other projections on its inner and outer surfaces to conform to and prevent the movement of the spring beyond the plate. In other embodiments, the upper spring seat may be provided as a plurality of radial projections which hold the upper end of a spring in place. It is to be appreciated that the upper spring seat can be secured to an upper portion of the shock absorber, the vehicle, or to the suspension.

In embodiments of the invention, the lower spring seat is provided as a mounting unit that may comprise a spring seat mount, a lower spring seat plate, and one or more spacers. In these embodiments, the exterior of the piston assembly of the shock absorber has a spring seat mount extending radially outward from the shock absorber. This spring seat mount may be an outward indentation, lip or ridge, or a plurality of indentations, lip segments or ridges designed to prevent the lower spring seat plate and/or spacers from sliding past the spring seat mount.

In these embodiments, the lower spring seat is a plate with a relatively flat surface at least as large as the diameter of the coil spring in order to receive and support the spring. The seat can have lips, indentations, or other projections on its inner and outer surfaces to conform to and prevent the movement of the spring beyond the plate. In some embodiments, the lower spring seat is a plurality of radial projections which hold the lower end of a spring in place. The lower spring seat has an interior opening that is about the same diameter as the piston assembly so that the spring seat surrounds the piston assembly but is stopped by and rests upon the ridge/lip/indentation(s) of the lower spring seat mount to prevent downward movement of the lower spring seat.

In some embodiments, the spring seat mount of the present invention is located at a position on the shock absorber that is ordinarily lower than that of the original equipment from the manufacturer. In these embodiments, if the lower spring seat plate is slidably placed directly on the lower seat mount, the spring will rest at a location lower than the original spring seat mount. This location of the lower spring seat plate and spring will lower the ride height of the vehicle due to the difference in distance form the mounting location on the original equipment and the spring seat mount of the present invention.

Embodiments of the present invention utilize one or more spacers placed between the lower spring seat mount and the lower spring seat plate to alter the lower position (mounting location) of the coil spring. The spacers can be provided in the form of a washer, shim, or other rigid device that has an inner opening large enough to receive the shock absorber, but small enough to be stopped by the ridge/lip/indentation(s) of the lower spring seat mount. The thickness of each spacer creates a distance between the lower spring seat mount and the lower spring seat plate. In some embodiments, one or more spacers can be employed by slidably lowering a first spacer on top of the lower spring seat mount; then, if additional spacers are desired, they are slidably placed on top of the spacer(s) already in place. Once a desired thickness is obtained using one or more spacers, the lower seat plate is then slidably placed on the top of the spacer(s). Therefore, the invention allows the user to modify the spring height, and therefore ride height of the vehicle by the addition or removal of spacers.

In alternative embodiments, spacers can be secured between the lower spring seat mount and the lower spring seat plate without removing the shock absorber from the vehicle. In some embodiments, the spacers may have a plurality segments that may be placed around a shock absorber, and the segments be fixedly secured in place. In further embodiments, the spacers may have a plurality of hinged segments that may be closed around the shock absorber with the ends of the segments of each spacer fixedly attached to each other to secure the spacer around the shock absorber. In other embodiments, each spacer may be provided in the form of a disc having a central opening and a radial cut, so that the spacer may be slightly deformed along the cut as it is installed around the shock absorber above the lower spring seat mount. It is to be appreciated that the invention contemplates other embodiments of spacers that may have parts that are attached together and/or inserted around the shock absorber to provide spacing thickness above the lower spring seat mount without requiring disconnection of the shock absorber.

In some embodiments all the spacers are of a uniform thickness (width) allowing for easy measurement of the change in height above the lower spring seat mount based on the number of spacers used. For example, if each spacer is one half inch in height, stacking 2 spacers onto the lower spring seat mount will raise the effective position of the mount by one inch. In other embodiments spacers of various thicknesses (widths) may be used in order to fine tune the height achieved. While spacers of any appropriate thickness may be used, proper adjustments can ordinarily be made using spacers having thicknesses between about 7 mm and about 23 mm (0.27 in. to about 0.91 in.). Other spacers may range in thickness from about ¼ inch to about one inch. Different colored spacers may be used to identify different thicknesses, making it easy to determine the total thickness from the colors of the spacers used. Further, graduated measurement markings may be placed on the shock absorber body to allow a user to easily determine the change in height from the lower spring seat mount due to the additions of spacers. It is to be appreciated that different combinations of thicknesses, types and colors of spacers may be used in various embodiments of the invention, with or without additional markings on the body of the shock absorber.

The invention allows for the ride height of the vehicle to be raised, lowered, or to remain the original ride height without major modifications to the suspension system. With the invention, a user can easily and quickly correct or adjust the ride height of vehicle. The installation of embodiments of the present invention is relatively simple and takes no further effort than that required to replace the shock and strut assemblies with original equipment.

It is therefore an object of the present invention to provide shock absorber and strut assemblies which can easily be modified to adjust the ride height of a vehicle.

It is a further object of the present invention to provide shock absorber and strut assemblies which can be modified to adjust the ride height of a vehicle that are capable of bolt-on installation.

It is a further object of the present invention to provide methods and apparatus for adjusting the ride height of a vehicle.

Additional objects of the invention will be apparent from the detailed descriptions and the claims herein.

DETAILED DESCRIPTION

Figure 1:
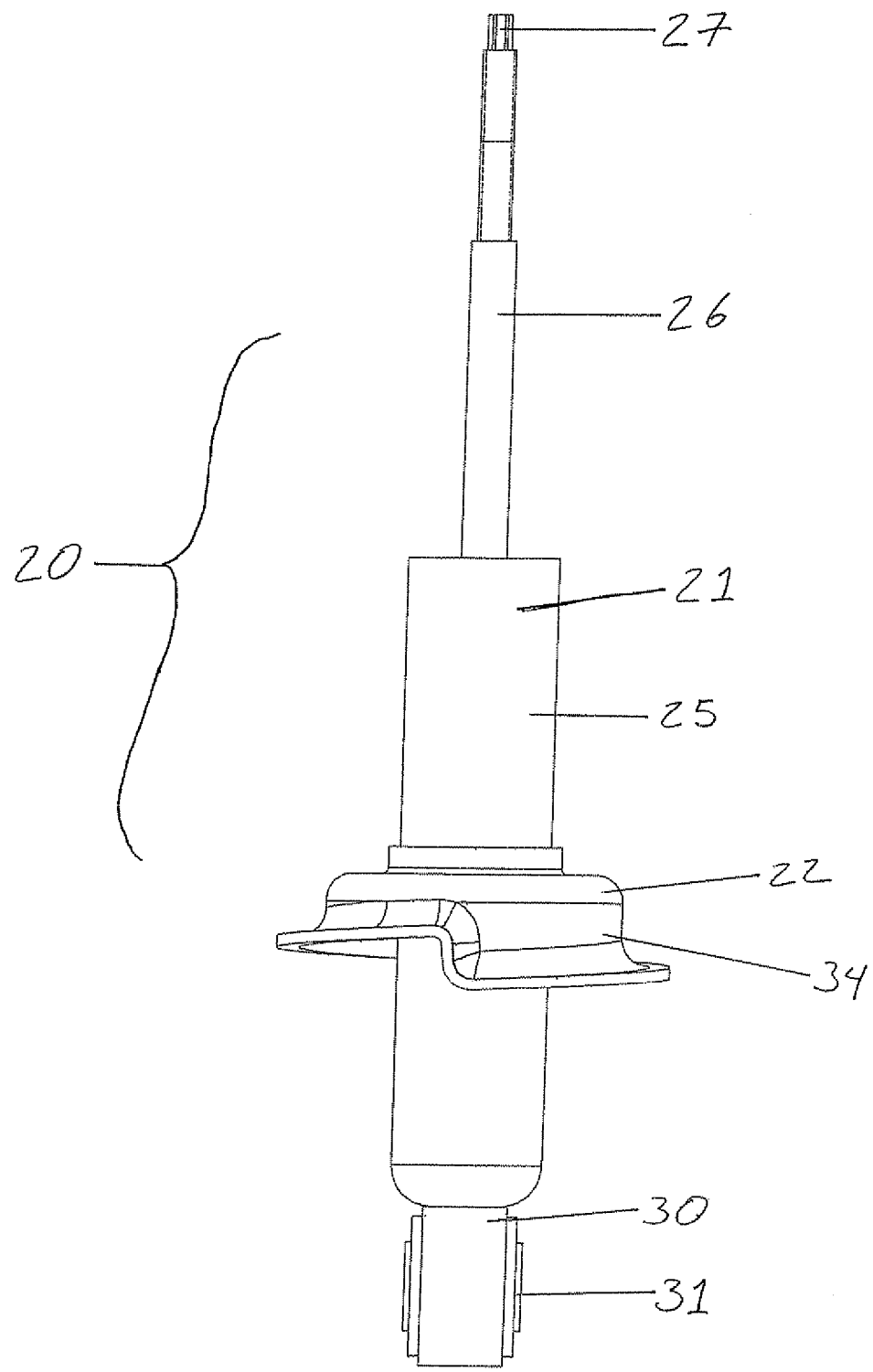
FIG. 1 is a side view of an embodiment of an unmodified strut.

Referring to the drawings wherein like reference characters designate like or corresponding parts throughout the several views, and referring particularly to FIG. 1, it is seen that a typical strut assembly 20 includes a shock absorber assembly 21, and a lower spring mounting unit 22. Such a strut assembly also includes an upper spring mounting unit and coil spring, neither of which is shown in FIG. 1. The shock absorber assembly is generally cylindrical in shape, consisting of a piston unit 25 with a piston shaft 26 exiting the piston unit 25. The piston shaft 26 has a means for securing the shaft 26 to the vehicle at its terminal 27. This can be done in a manner commonly known in the art such as, but not limited to, having a threaded end accepting a bolt, or the presence of a hole for the insertion of a locking pin. The lower end of the shock absorber assembly typically has a transversely positioned opening 30 for the attachment of the lower end of the strut assembly to be secured to a part of the suspension of a vehicle, commonly a steering knuckle, although attachment may be made to other similar suitable structures of the vehicle suspension assembly, including forks, etc. The opening 30 is usually fitted with a bushing 31, further dampening the vibrations received from the steering knuckle.

The lower spring mounting unit creates a base upon which a coil spring sits, The lower spring seat plate 34 is generally flat and round in shape with indentations appropriately located to conform to the end of a coil spring to prevent movement of the spring when positioned on the seat. In a factory created strut, such as that depicted in FIG. 1, the lower spring seat mount (35) is often welded in place which securely attaches the lower spring seat plate 34 in a permanently fixed position, preventing any adjustment in height of the lower spring seat plate.

Figure 2:
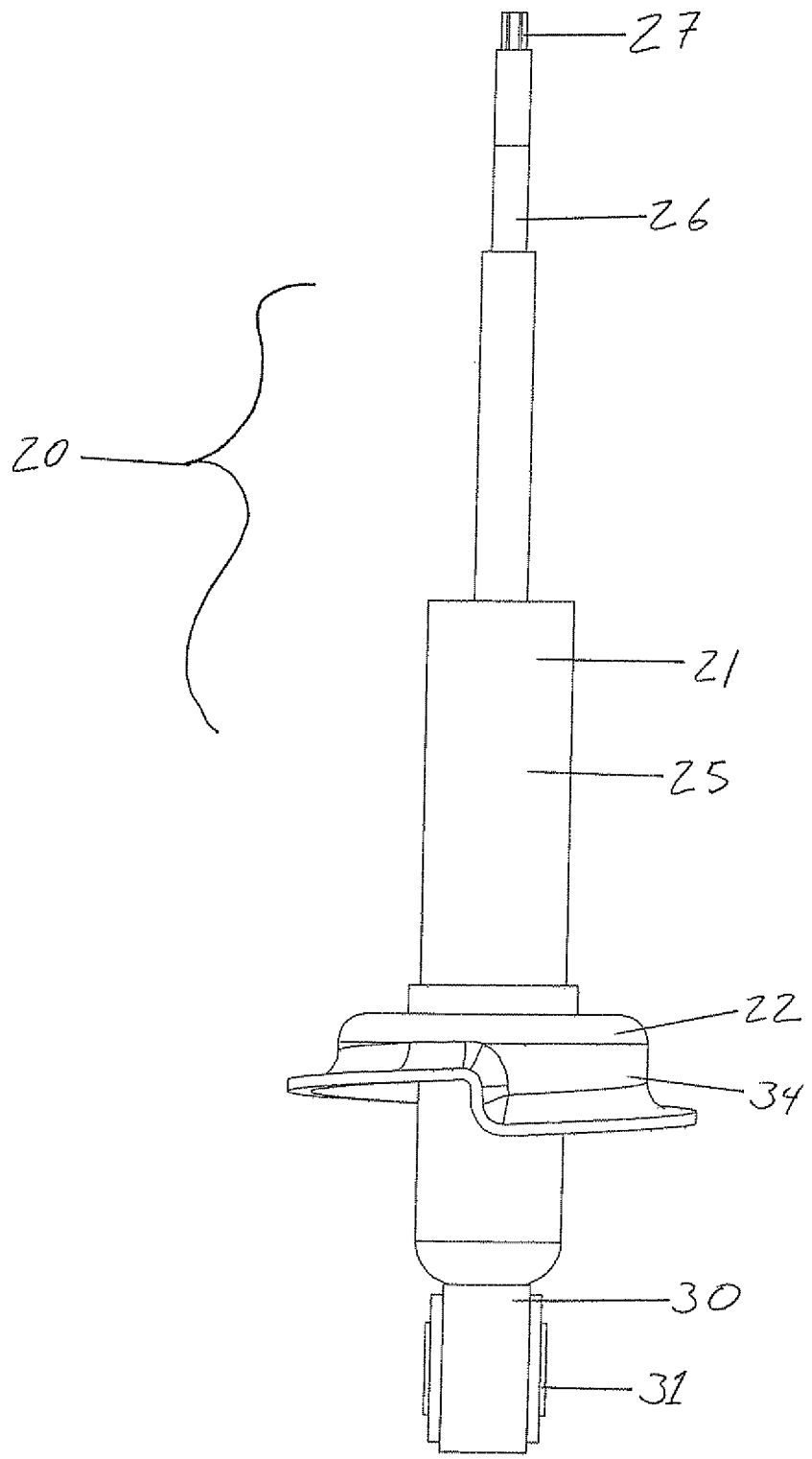
FIG. 2 is a side view of an embodiment of a strut of the present invention showing the lower spring seat mount and plate in a lowered position relative to the position of a corresponding factory strut.

FIG. 2 depicts a strut assembly having a lower spring seat mount (35) that is positioned lower than that shown in FIG. 1. As in FIG. 1, the lower spring seat plate 34 bears directly against the lower spring seat mount. The spring seat mount (35) prevents the spring seat plate 34 from moving any lower on the piston unit 25. The placement of the spring (40) on this lowered spring seat plate 34 creates a greater distance from the lower spring seat plate 34 to the upper seat plate (affixed in proximity to the end of the piston shaft 26). The weight of the vehicle will compress the exemplary shock absorber (and the spring) illustrated in FIG. 2 to a position that is lower than that shown in FIG. 1, thereby causing the vehicle to be lowered.

Figure 3:
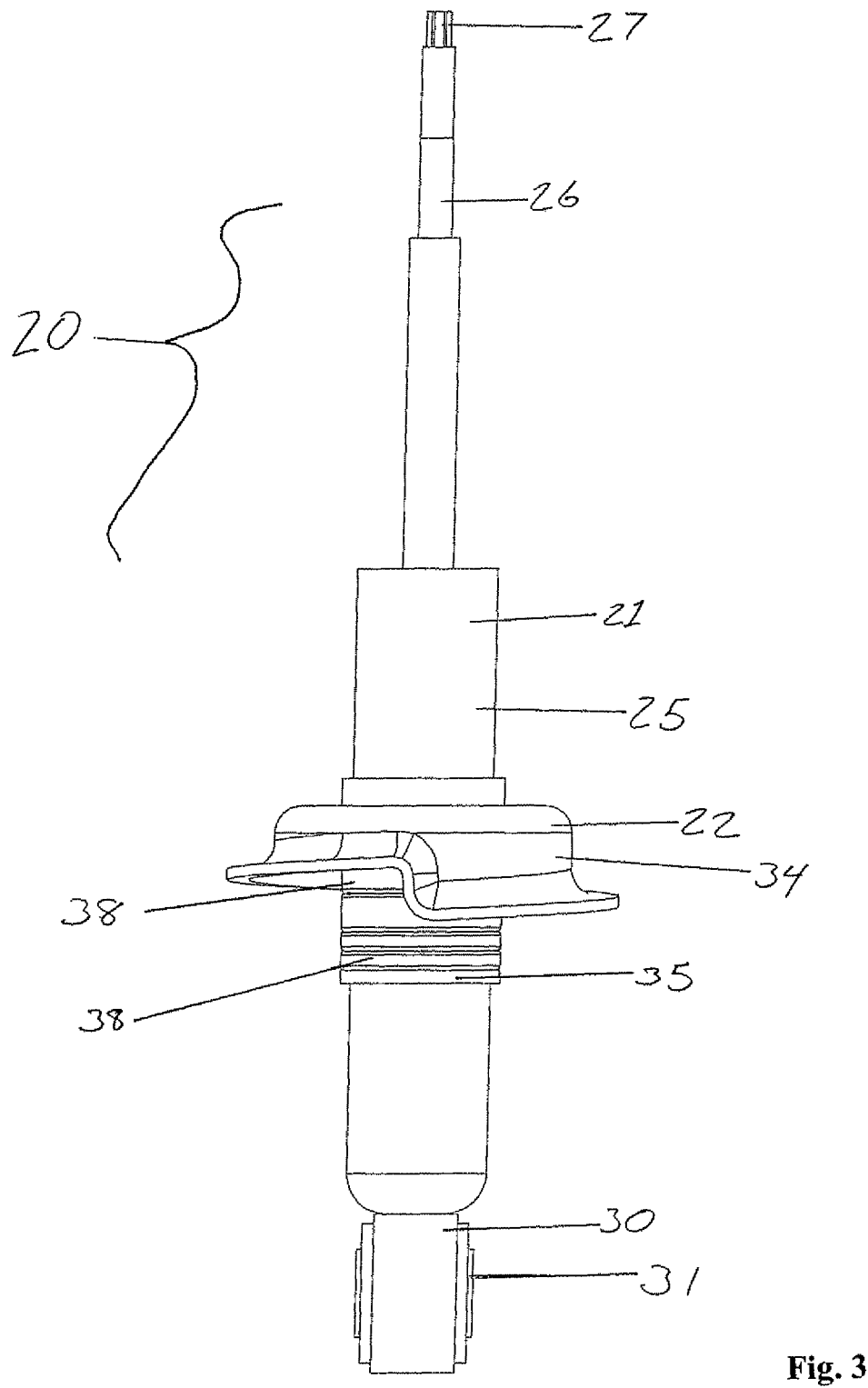
FIG. 3 is a side view of an embodiment of a strut of the present invention showing the lower spring seat plate in a raised position by the use of spacers.

FIG. 3 depicts an exemplary strut assembly of the present invention where spacers 38 have been inserted between the lower spring seat mount 35 and the lower spring seat plate 34 to raise the location of the spring seat plate 34 with respect to the piston unit 25. The lower spring mount 35 can be a ridge, lip or other structure extending outwardly from the piston unit 25 to prevent further downward movement of the lower spring seat plate 34. It should be noted that in the exemplary embodiment of FIG. 3, the spring seat mount 35 happens to be at the same height as the spring seat mount in the exemplary embodiment of FIG. 2, where the lower spring seat plate was lower than the exemplary embodiment of FIG. 1. With the addition of the spacers 38, the lower spring seat plate 34 may be moved to a raised position. Depending on the desired height, one or more spacer(s) 38 can be placed on top of the spring seat mount 35. It is to be appreciated that spacers 38 may be of different thicknesses (heights) in order to fine tune the distance by which the lower spring plate is raised. Since the spring is compressed the same by the weight of the vehicle, the higher placement of the lower spring seat plate 34 using the spacer(s) 38 increases the ride height of the vehicle.

Figure 4:
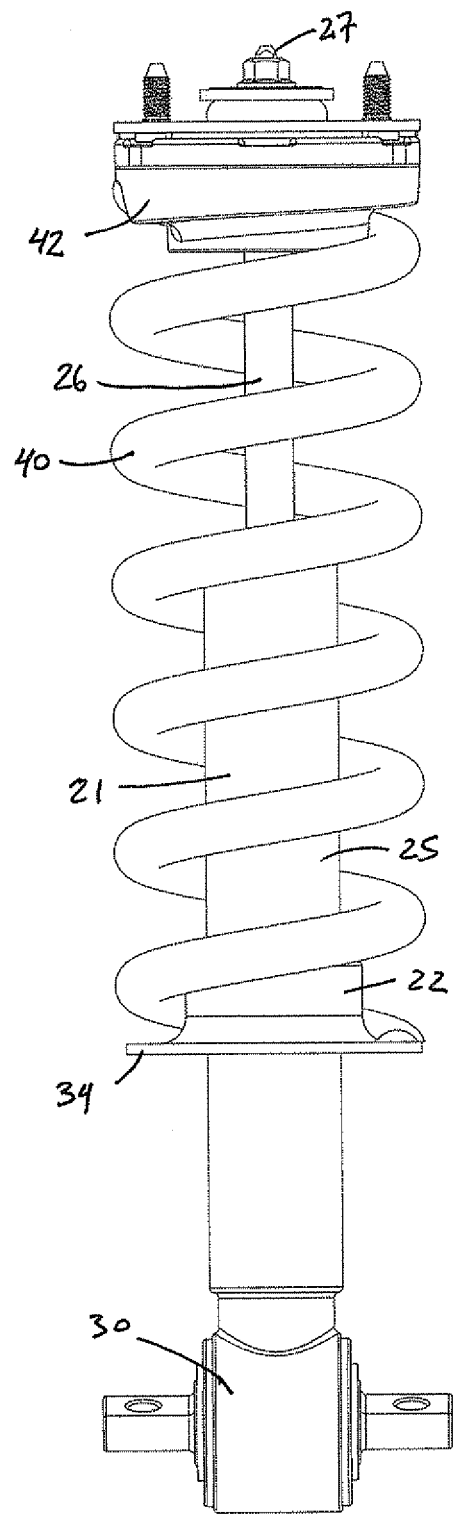
FIG. 4 is a side view of an alternative embodiment of an unmodified strut.

FIG. 4 depicts an exemplary strut assembly 20 including a coil spring 40 and an upper spring seat plate 42. The lower end of the coil spring 40 is secured by the lower spring seat plate 34, and the upper end of the coil spring 40 is secured by the upper spring seat plate 42. In the embodiment shown in FIG. 4, the upper spring seat plate 42 is secured to the piston shaft 26. The coil spring 40 maintains a relatively standard distance when loaded under the weight created by the vehicle. Accordingly, the length of the strut assembly incorporates the total distance of the spring under load, and the portion of the spring assembly on either end of the upper spring seat plate 42 and lower spring seat plate 34.

Figure 5:
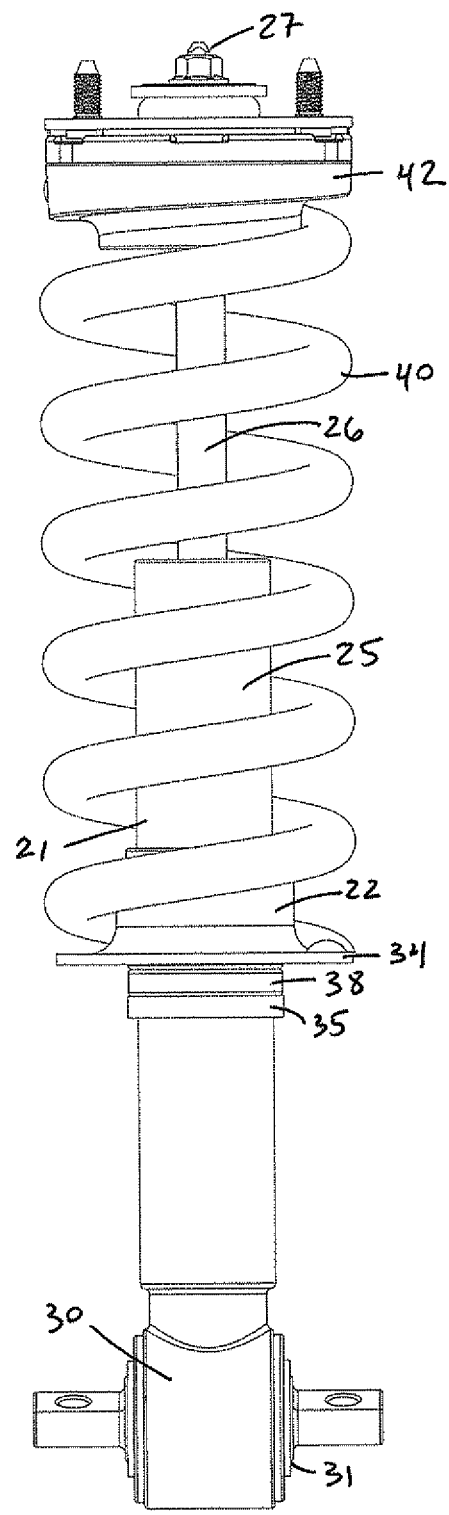
FIG. 5 is a side view of an embodiment of a strut of the present invention showing a coil spring in which the position of a lower spring seat plate has been raised using spacers.
Figure 6:
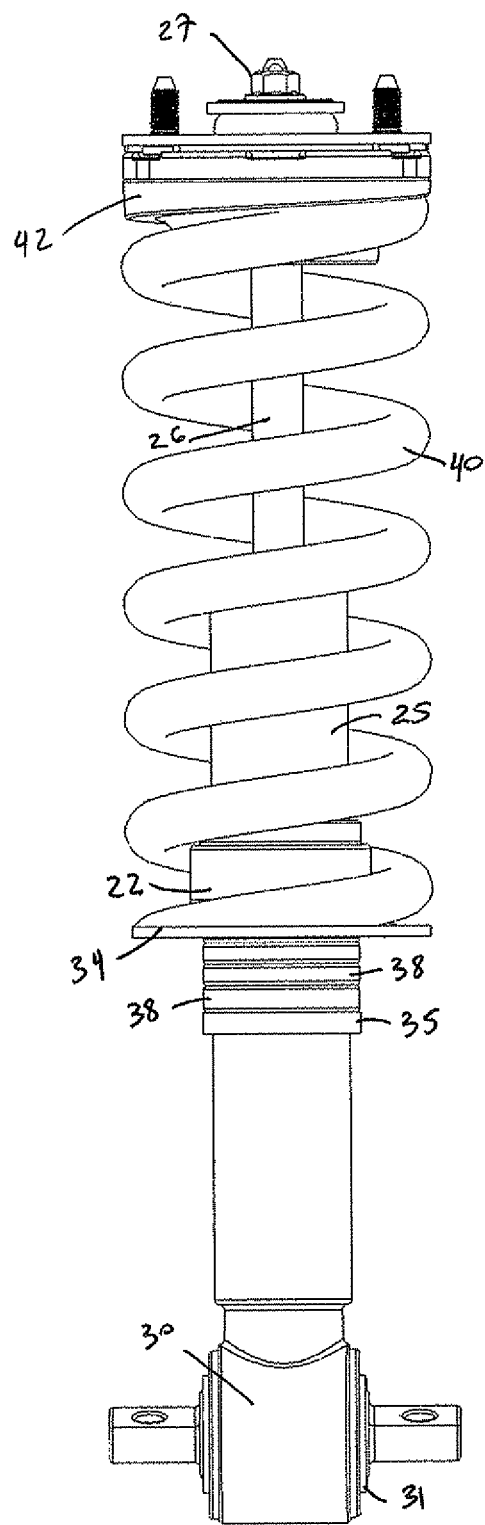
FIG. 6 is a side view of another embodiment of a strut of the present invention showing a coil spring in which the position of a lower spring seat plate has been raised using spacers.

FIGS. 5 and 6 depict exemplary strut assemblies 20 in which one or more spacers 38 have been inserted between the spring seat mount 35 and the lower spring seat plate 34. The spacers raise the location of the lower spring seat plate 34 higher in relation to the spring seat mount 35. Accordingly, the bottom end of the coil spring 40 rests at a location higher in relation to that of the coil spring shown in FIG. 4 or 5. The upper spring seat plate 42 remains in the same position in relation to the strut assembly 20, however, the result of the spacers creates a strut assembly that is a greater length.

It is to be appreciated that different versions of the invention may be made from different combinations of the various features described above. In particular, any number of spacers 38 (of the same or different thicknesses), including using the apparatus without spacers, may be used allowing the user to easily modify the ride height of the vehicle in either an upward or downward direction.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

What is claimed is:

1. An adjustable vehicle strut assembly comprising:
  a. a shock absorber having a piston assembly extending from a first end of the shock absorber to a second end of the shock absorber;
  b. a spring seat mount fixedly attached to the shock absorber at a position that is lower than that of a comparable factory shock absorber;
  c. a lower spring plate movably deployed above said spring seat mount; and
  d. at least one spacer slidably provided along said shock absorber between said spring seat mount and said lower spring plate, each such spacer having a uniform axial height, such that said lower spring plate rests on an uppermost spacer.

2. The strut assembly of claim 1 wherein said spring seat mount comprises a lip around said shock absorber, said lip having an outside perimeter, and wherein each spacer has a central opening therein having an internal diameter that is smaller than the outside perimeter of said lip.

3. The strut assembly of claim 2 wherein each spacer has an outside perimeter that is greater than the outside perimeter of said lip.

4. The strut assembly of claim 2 wherein said at least one spacer comprises a plurality of spacers.

5. The strut assembly of claim 4 wherein each spacer has the same height.

6. The strut assembly of claim 4 wherein each spacer has a different height.

7. The strut assembly of claim 4 wherein said plurality of spacers are selected from the group consisting of a spacer with a first height, a spacer with a second height, a spacer with a third height, and combinations thereof.

8. The strut assembly of claim 1 wherein said at least one spacer is operable to raise a height of said vehicle in a range from below to above a ride height of the originally manufactured vehicle.

9. The strut assembly of claim 1 wherein said at least one spacer is operable to raise a height of at least one of a front end or a back end of the vehicle in a range from below to above a corresponding height of the originally manufactured vehicle.

10. The strut assembly of claim 1 wherein said spring seat mount has an upper surface for abutting one of said spacers, said upper surface being perpendicular to an axis of said strut assembly.

11. An adjustable vehicle strut assembly comprising:
    a. a shock absorber having a piston assembly extending from a first end of the shock absorber to a second end of the shock absorber;
    b. a spring seat mount fixedly attached to the shock absorber;
    c. a lower spring plate movably deployed above said spring seat mount; and
    d. at least one spacer slidably provided along said shock absorber between said lower spring seat mount and said spring plate, each such spacer having a uniform axial height, such that said lower spring plate rests on an uppermost spacer,
    wherein said spring seat mount comprises a lip around said shock absorber, said lip having an outside perimeter, and wherein each spacer has a central opening therein having an internal diameter that is smaller than the outside perimeter of said lip and each spacer has an outside perimeter that is greater than the outside diameter of said lip.

12. The strut assembly of claim 11 wherein said spring seat mount is secured to said shock absorber at a position lower than that of a comparable factory shock absorber.

13. The strut assembly of claim 11 wherein said at least one spacer comprises a plurality of spacers.

14. The strut assembly of claim 13 wherein each spacer has the same height.

15. The strut assembly of claim 13 wherein said spacers have different heights.

16. The strut assembly of claim 13 wherein said plurality of spacers are selected from the group consisting of a spacer with a first height, a spacer with a second height, a spacer with a third height, and combinations thereof.

17. The strut assembly of claim 11 wherein said at least one spacer is operable to raise a height of said vehicle in a range from below to above a ride height of the originally manufactured vehicle.

18. The strut assembly of claim 11 wherein said at least one spacer is operable to raise a height of at least one of a front end or a back end of the vehicle in a range from below to above a corresponding height of the originally manufactured vehicle.

19. An adjustable vehicle strut assembly comprising:
    a. a shock absorber having a piston assembly extending from a first end of the shock absorber to a second end of the shock absorber;
    b. a spring seat mount fixedly attached to the shock absorber at a position that is lower than that of a comparable factory shock absorber;
    c. a lower spring plate movably deployed above said spring seat mount; and
    d. at least one spacer slidably provided along said shock absorber between said spring seat mount and said lower spring plate such that said lower spring plate rests on an uppermost spacer, each spacer having an upper surface and a lower surface wherein said upper and lower surfaces are substantially parallel to each other.

20. The strut assembly of claim 19 wherein said spring seat mount comprises a lip around said shock absorber, said lip having an outside perimeter, and wherein each spacer has a central opening therein having an internal diameter that is smaller than the outside perimeter of said lip.

21. The strut assembly of claim 20 wherein each spacer has an outside perimeter that is greater than the outside perimeter of said lip.

22. The strut assembly of claim 19 wherein said spring seat mount has an upper surface for abutting one of said spacers, said upper surface being perpendicular to an axis of said shock absorber of said strut assembly.

23. An adjustable vehicle strut assembly comprising:
    a. a shock absorber having a piston assembly extending from a first end of the shock absorber to a second end of the shock absorber;
    b. a lower spring seat mount fixedly attached to the shock absorber;
    c. a lower spring plate movably deployed above said lower spring seat mount; and
    d. a plurality of spacers slidably provided along said shock absorber between said lower spring seat mount and said lower spring plate, each such spacer having a uniform axial height, such that said lower spring plate rests on an uppermost spacer.

24. The strut assembly of claim 23 wherein said lower spring seat mount comprises a lip around said shock absorber, said lip having an outside perimeter, and wherein each spacer has a central opening therein having an internal diameter that is smaller than the outside perimeter of said lip.

25. An adjustable vehicle strut assembly comprising:
    a. a shock absorber having a piston assembly;
    b. a lower spring seat mount fixedly attached to the piston assembly;
    c. a lower spring seat movably positioned above said lower spring mount; and
    d. a plurality of slidable means, each such means having a uniform height for supporting the lower spring seat and adjusting the height thereof.

* * * * *